(12) United States Patent
Sakata et al.

(10) Patent No.: US 11,764,658 B2
(45) Date of Patent: Sep. 19, 2023

(54) ELECTRIC MOTOR AND METHOD FOR MANUFACTURING ELECTRIC MOTOR

(71) Applicant: MITSUBA Corporation, Gunma (JP)

(72) Inventors: Kenji Sakata, Gunma (JP); Akihiro Kaihatsu, Gunma (JP)

(73) Assignee: MITSUBA Corporation, Gunma (JP)

( * ) Notice: Subject to any disclaimer, the term of this patent is extended or adjusted under 35 U.S.C. 154(b) by 266 days.

(21) Appl. No.: 17/223,028

(22) Filed: Apr. 6, 2021

(65) Prior Publication Data
US 2021/0320579 A1    Oct. 14, 2021

(30) Foreign Application Priority Data

Apr. 8, 2020  (JP) ................... 2020-069716

(51) Int. Cl.
*H02K 23/26* (2006.01)
*H02K 11/33* (2016.01)
*H02K 7/00* (2006.01)
*H02K 13/04* (2006.01)
*H02K 13/00* (2006.01)
*H02K 3/28* (2006.01)

(52) U.S. Cl.
CPC .............. *H02K 23/26* (2013.01); *H02K 3/28* (2013.01); *H02K 7/003* (2013.01); *H02K 11/33* (2016.01); *H02K 13/006* (2013.01); *H02K 13/04* (2013.01)

(58) Field of Classification Search
CPC ...... H02K 11/33; H02K 13/006; H02K 13/04; H02K 23/26; H02K 3/28; H02K 7/003; H02K 7/106; H02K 7/1166; H02P 3/06; H02P 7/0094; H02P 7/04; H02P 7/24; Y02D 30/70

See application file for complete search history.

(56) References Cited

U.S. PATENT DOCUMENTS

| | | | | |
|---|---|---|---|---|
| 2006/0236802 | A1* | 10/2006 | Sesita | H02K 7/106 74/425 |
| 2006/0238060 | A1* | 10/2006 | Sesita | H02K 23/26 310/198 |
| 2014/0252909 | A1* | 9/2014 | Sakata | H02K 23/30 242/433 |

FOREIGN PATENT DOCUMENTS

EP   2658096 A2 * 10/2013 ........... B60K 7/0007
JP   S6134867      2/1986
(Continued)

OTHER PUBLICATIONS

Boughtwood M, EP-2658096-A2, all pages (Year: 2013).*
Hoshino A, JP-2013090382-A, all pages (Year: 2013).*

*Primary Examiner* — Naishadh N Desai
(74) *Attorney, Agent, or Firm* — JCIPRNET

(57) ABSTRACT

An electric motor and a method for manufacturing an electric motor capable of improving rotation balance of an armature and realizing effective brake braking with a simple configuration are provided. In an electric motor including an armature core having a plurality of teeth and teeth within a yoke, a winding wound between the slots, and a commutator having a plurality of segments to which the winding is connected, the winding has a main winding that applies a rotational force to the armature core and a brake winding that applies a braking force to the armature core, and an H bridge circuit is built between the winding and a power supply, and the main winding and the brake winding of the winding are disposed at positions for adjusting balance when the armature core rotates.

9 Claims, 6 Drawing Sheets

(56) References Cited

FOREIGN PATENT DOCUMENTS

| | | | | |
|---|---|---|---|---|
| JP | 2013090382 | A | * | 5/2013 |
| JP | 2013090428 | | | 5/2013 |

* cited by examiner

ELECTRIC MOTOR AND METHOD FOR MANUFACTURING ELECTRIC MOTOR

CROSS-REFERENCE TO RELATED APPLICATION

This application claims the priority benefit of Japan application serial no. 2020-069716, filed on Apr. 8, 2020. The entirety of the above-mentioned patent application is hereby incorporated by reference herein and made a part of this specification.

BACKGROUND

Technical Field

The present disclosure relates to an electric motor that controls drive of power windows of an automobile and a method for manufacturing the electric motor.

Description of Related Art

As an electric motor mounted in a vehicle such as an automobile, for example, an electric motor with a brush, for which pulse width modulation (PWM) as disclosed in Patent Document 1 is performed, is frequently used.

In an electric motor of such a type, multiple magnets are disposed on an inner circumferential face of a yoke having a cylindrical shape in a circumferential direction at equal intervals, and an armature is supported to be rotatable on an inner side of these magnets.

The armature has an armature core in which multiple teeth are formed in a radial pattern. Multiple slots, which are long in in axial direction, are formed between the teeth, and for example, a winding is wound between the slots having a predetermined space interposed therebetween using a lap winding method.

However, there are cases in which the electric motor disclosed in Patent Document 1 is used as a power window (P/W) motor that automatically closes/opens windows of a vehicle.

In such an electric motor, an open circuit is formed when the power is off. Thus, when a motor output shaft is turned in accordance with forced glass lowering according to a glass weight or an external force, an electromagnetic brake does not work like when a closed circuit is formed, and there is concern that the windows are open.

In order to solve such a problem, for example, an armature for an electric motor described in Patent Document 2 is known.

This armature for an electric motor has a main armature winding and a short-circuit winding that inhibits rotation at the time of a low load, the short-circuit winding are wound around a slot of an iron core using the same conducting wire as the main armature winding and both ends of the short-circuit winding are fixed to a claw of a commutator, whereby a closed circuit is formed.

In such an armature for an electric motor, reverse rotation of the armature is prevented using the closed circuit formed using the short-circuit winding.

PATENT DOCUMENTS

[Patent Document 1] Japanese Patent Laid-Open No. 2013-90428
[Patent Document 2] Japanese Utility Patent Publication No. S61-34867

In the electric motor disclosed in Patent Document 1, although a closed circuit in which a braking force is applied can be formed by employing the technology of Patent Document 2, a specific configuration for the circuit configuration/arrangement of windings is not clear, and provision of a new technology has been expected.

SUMMARY

In order to resolve the problems described, the present disclosure proposes the following means.

In the present disclosure, there is provided an electric motor including: a rotation shaft supported by a yoke to be rotatable; an armature core mounted in the rotation shaft and having a plurality of teeth radially extending in a diameter direction and having a plurality of slots formed between the teeth; a winding wound between predetermined slots among the plurality of slots; and a commutator disposed to be adjacent to the armature core in the rotation shaft and having a plurality of segments to which the winding is connected, in which the winding has a main winding that applies a rotational force to the armature core and a brake winding that applies a braking force to the armature core, and an H bridge circuit is built between the winding and a power supply, and the main winding and the brake winding of the winding are disposed at positions for adjusting balance when the armature core rotates.

DESCRIPTION OF THE EMBODIMENTS

The present disclosure is in view of the situations described above and provides an electric motor capable of improving rotation balance of an armature with a simple configuration and realizing constant braking of a brake even in a case in which power of a bridge circuit turns off and each switching element turns off and a method for manufacturing the electric motor.

(Motor with Deceleration Part)

A first embodiment of the present disclosure will be described with reference to FIGS. 1 to 4.

Figure 1:
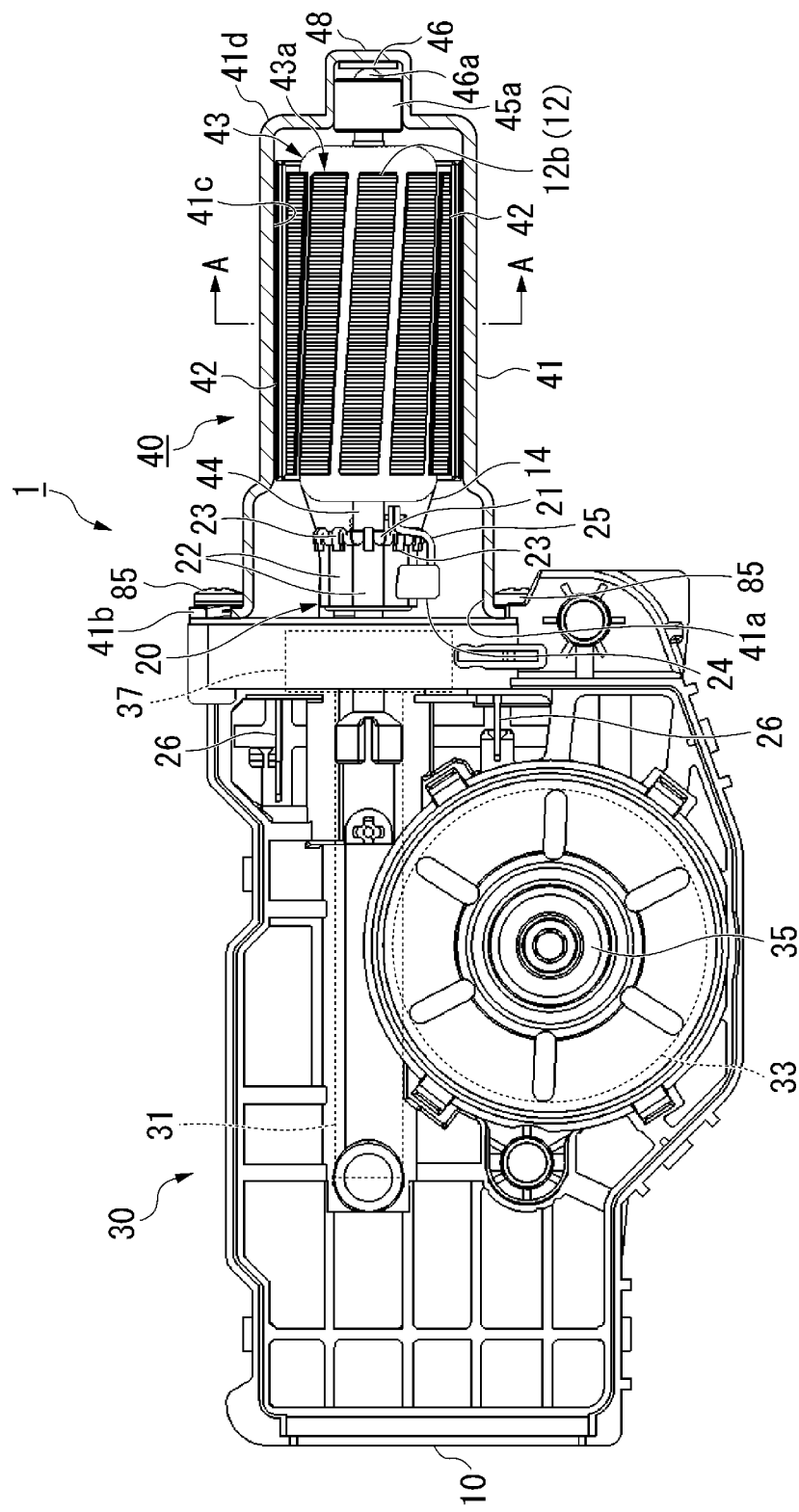
FIG. 1 is a partial cross-sectional plan view of a motor device with a deceleration part according to an embodiment of the present disclosure.
Figure 2:
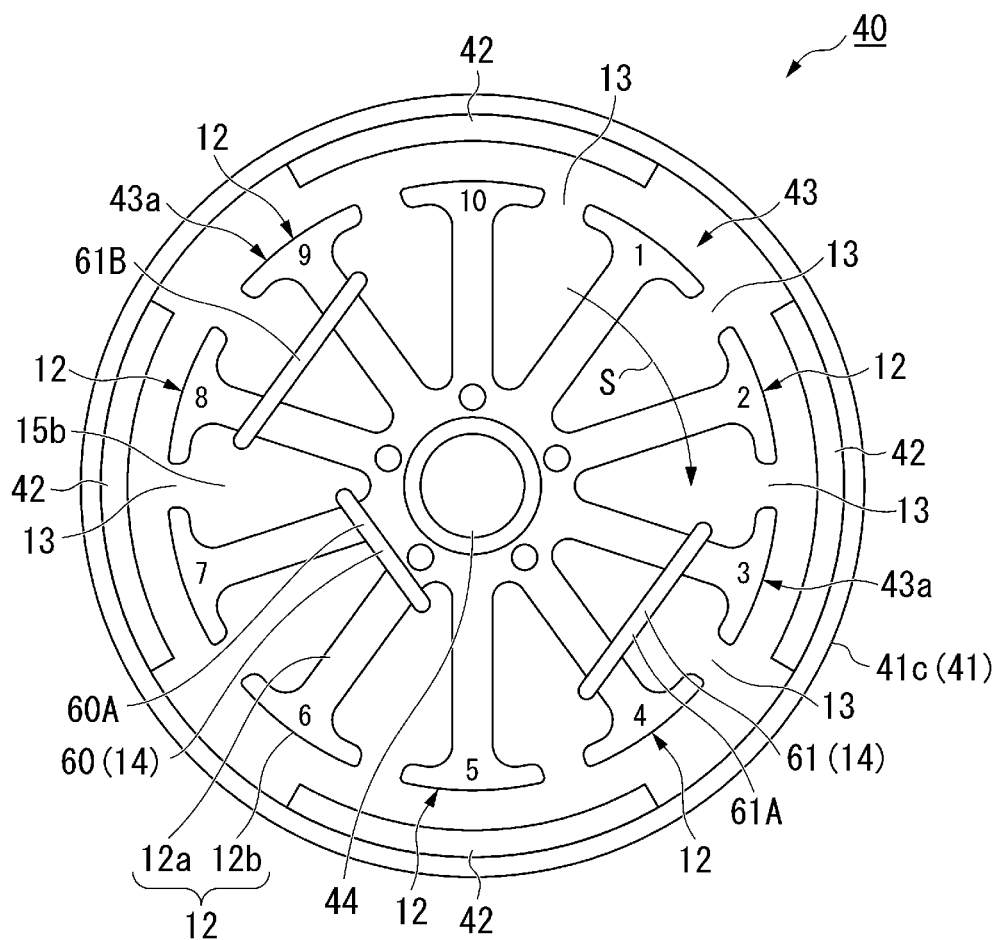
FIG. 2 is a cross-sectional view taken along line A-A illustrated in FIG. 1.

FIG. 1 is a partial cross-sectional plan view of a motor device 1 with a deceleration part, and FIG. 2 is a cross-sectional view taken along line A-A illustrated in FIG. 1.

As illustrated in FIGS. 1 and 2, the motor device 1 with a deceleration part includes an electric motor 40 and a deceleration mechanism 30 connected to the electric motor 40.

The deceleration mechanism 30 is acquired by housing a worm 31 and a worm wheel 33 engaged with this worm 31 inside a gear case 10. The worm wheel 33 is a member made of a resin, metal, or the like and is formed through injection molding, sintering, machine processing, and the like.

An output gear 35 is connected to the worm wheel 33. The output gear 35 is exposed to outside of the gear case 10 and, for example, is connected to an opening/closing device of window glasses of an automobile.

On the other hand, a rotation shaft 44 of the electric motor 40 is connected to one end of the worm 31 through a joint member 37 to be unable to relatively rotate. In this way, a rotational force of the electric motor 40 is transferred to the output gear 35 through the worm 31 and the worm wheel 33.

(Electric Motor)

The electric motor 40 includes a yoke 41 and an armature 43 that is supported to be rotatable at the inner side of the yoke 41.

The yoke 41 is made of a magnetic material such as iron and, for example, is formed in a bottomed cylindrical shape by performing press working using deep drawing on a metal plate or the like. The yoke 41 is mounted such that an opening portion 41a thereof faces the deceleration mechanism 30 side. A flange part 41b is formed on a peripheral edge of the opening portion 41a of the yoke 41. An attachment hole, which is not illustrated, passing through the flange part 41b is formed in the flange part 41b. By causing a bolt 85 to be inserted into and to pass through the attachment hole of the flange part 41b and by fastening the bolt 85 to the gear case 10, the yoke 41 is fixed to the gear case 10.

In a cylinder part 41c of the yoke 41, four magnets 42 formed in a tile shape are disposed on an inner peripheral face such that magnetic poles are in order at equal intervals in a circumferential direction. The magnets 42 are attached to the yoke 41 using an adhesive agent or the like.

In a bottom part 41d of the yoke 41, a boss part 48 protruding to a side opposite to the deceleration mechanism 30 is formed. On the inner side of the boss part 48, a slide bearing 45a for supporting one end of the rotation shaft 44 of the armature 43 to be rotatable is internally fitted and fixed.

In addition, a thrust plate 46 is disposed on the bottom part side in the boss part 48 of the yoke 41. The thrust plate 46 receives a thrust load of the rotation shaft 44 through a steel ball 46a. The steel ball 46a is used to reliably transfer the thrust load of the rotation shaft 44 to the thrust plate 46 by reducing sliding resistance between the rotation shaft 44 and the thrust plate 46 and absorbing a core deviation of the rotation shaft 44.

The armature 43 has the rotation shaft 44, an armature core 43a that is externally inserted into and fixed to the rotation shaft 44, and a commutator 20 that is disposed on the deceleration mechanism 30 side from the armature core 43a.

The deceleration mechanism 30 side of the rotation shaft 44 is supported at a sliding bearing 45b (not illustrated) disposed in the gear case 10 to be rotatable.

The armature core 43, for example, is formed to be long in an axial direction by stacking magnetic materials, such as electromagnetic steel sheets, and is disposed at a position corresponding to the magnets 42. In the armature core 43a, ten teeth 12 are formed over the entire circumference in a radial pattern to be equally spaced in a circumferential direction.

Each of the teeth 12 is composed of a winding drum 12a extending to the outer side in the diameter direction and an outer circumferential part 12b that is disposed at a tip end of the winding drum 12a and extends in the circumferential direction. In other words, the outer circumferential part 12b disposed at the tip end of the teeth 12 configures an outer circumferential face of the armature core 43a and is in the state of facing the magnets 42. In addition, each of the teeth 12 has an extending direction that is twisted with respect to the axial direction and has a predetermined skew angle.

In addition, slots 13 are formed between the teeth 12 that are adjacent in the circumferential direction. A winding 14 is inserted into and passes through predetermined slots 13 among these slots 13, and the winding 14 is wound around the winding drum 12a of the teeth 12 through an insulator, which is not illustrated, that is an insulating body (details will be described later).

The commutator 20 includes a main body part 21 having a cylindrical shape that is externally fitted and fixed to the rotation shaft 44 and ten segments 22 that are arranged to be aligned on the outer circumferential face of the main body part 21 in the circumferential direction. Thus, the electric motor 40 according to this embodiment is formed as the electric motor 40 that is configured to have a so-called four poles-ten slots-ten segments structure having four magnets 42, ten slots 13, and ten segments 22.

The main body part 21 of the commutator 20 is formed using a synthetic resin, and ten segments 22 are in the state of being insulated from each other. The segment 22 is formed using a plate-shaped metal piece that is long in the axial direction, and an end portion of this armature core 32a side is bent in the form of being turned around to the outer diameter side, and that portion is configured as a riser 23.

A winding starting end and a winding finishing end (to be described later) of the winding 14 are wound around this riser 23 and fixed through fusing. In accordance with this, the segments 22 and the winding 14 become conductive.

One pair of brushes 24 are disposed on the outer periphery of the commutator 20. These brushes 24 are disposed to freely move forward and backward toward the commutator 20 through a brush holder (not illustrated). In addition, the brushes 24 are slid to be in contact with the segments 22 in the state of being biased to the commutator 20 side by a spring (not illustrated).

One end of a pigtail 25 is connected to a base end side of each brush 24. The other end of the pigtail 25 is connected to a connector terminal 26 disposed in the gear case 10. The connector terminal 26 is disposed to protrude such that it is exposed externally from the gear case 10 and is connectable to a connector extending from an external power supply (not illustrated). In accordance with this, a current is supplied to the winding 14 through the brushes 24 and the commutator 20.

In addition, such an electric motor 40 extracts a current ripple superimposed on a motor current flowing through the commutator 20 and can detect the number of revolutions and a rotation angle of the motor rotation shaft on the basis of this current ripple. In this way, a sensor used for detecting rotation of the motor and detection of a position does not need to be additionally provided, and thus, a so-called sensorless method can be employed, and the rotation status of the motor rotation shaft can be acquired in a simple manner.

(Winding Method of Winding)

Next, a method for winding the winding 14 around the armature core 43a will be described with reference to FIGS. 2 and 3.

Figure 3:
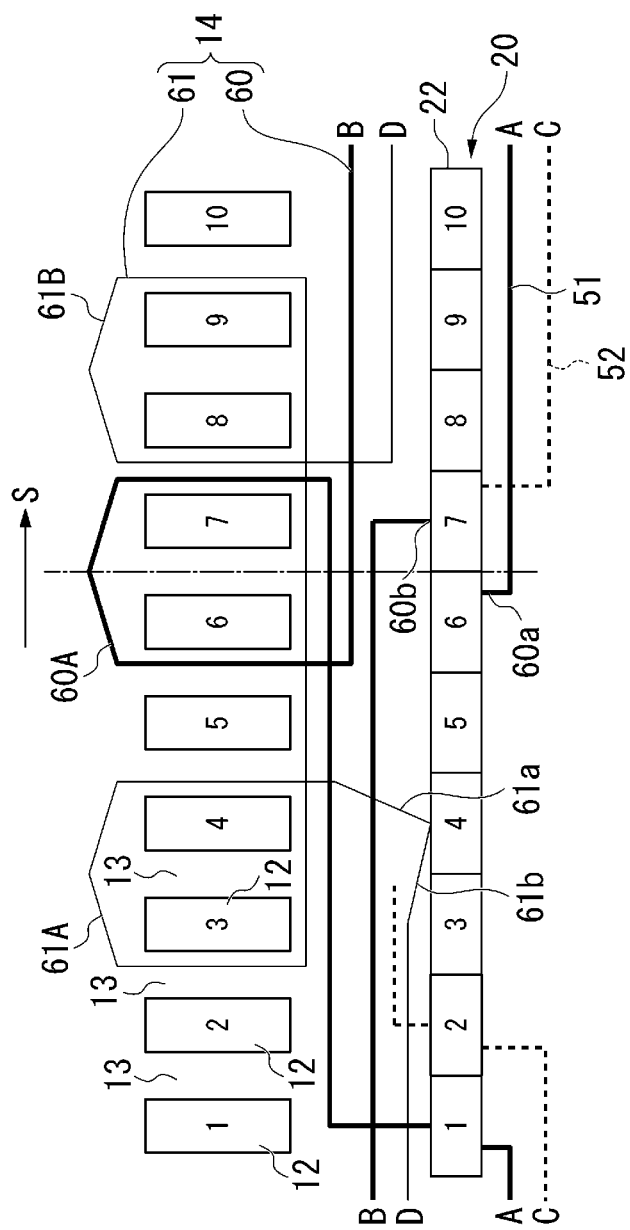
FIG. 3 is a development view of an armature according to a first embodiment of the present disclosure.

FIG. 3 is a development view of the armature 43, and a gap between the teeth 12 adjacent to each other corresponds to the slot 13.

In the following description, "numbers 1 to 10" will be respectively assigned to the teeth 12 and the segments 22 of the commutator 20.

As windings 14 wound around the teeth of the armature 43, two types of a main winding 60 and a brake winding 61 are provided.

The winding 14 illustrated in FIG. 3 illustrates an example of one winding method, and a plurality of windings (other windings are not illustrated) wound using a winding method similar to that of the winding 14 are disposed while the positions of the teeth 12 are shifted in the direction of an arrow S.

First, as illustrated in FIG. 3, for example, after a winding starting end 60a is wound around the riser 23 of the segment of "6", it is wound around the riser 23 of the segment 22 of "1" that is a segment having the same electric potential as the segment 22 of "6", whereby the main winding 60 of the winding 14 forms a connection line 51.

Thereafter, the main winding 60 is wound counterclockwise between the slot 13 disposed between the teeth 12 of "7" and "8" and the slot 13 disposed between the teeth 12 of "5" and "6", thereby forming a small coil 60A. In other words, the small coil 60A is formed by winding the main winding 60 counterclockwise such that the teeth 12 of "6" and "7" are on the inner circumferential side.

Thereafter, the main winding 60 is drawn from the slot 13 disposed between the teeth 12 of "5" and "6", and the winding finishing end 60b thereof is wound around the riser 23 of the segment 22 of "7" adjacent to the segment 22 of "6".

Here, the segments 22 that have the same electric potential, in other words, the segments 22 that are present at positions having a point symmetry with respect to the rotation shaft 44 as its center (for example, the segment 22 of "2" and the segment 22 of "7") are short-circuited by a connection line 52 acquired by extending the main winding 60.

Then, in such a main winding 60, a rotating magnetic field of the small coil 60A generated in accordance with conduction is applied to the magnets 42, whereby power for rotating the rotation shaft 44 together with the armature 43 is generated.

Next, the brake winding 61 of the winding 14 will be described with reference to FIG. 3.

For example, after the winding starting end 61a is wound around the riser 23 of the segment 22 of "4", it is wound counterclockwise between the slot 13 disposed between the teeth 12 of "4" and "5" and the slot 12 disposed between the teeth 12 of "2" and "3", whereby the brake winding 61 forms a small coil 61A.

Thereafter, for example, after this brake winding 61 forms a small coil 61B by being wound counterclockwise between the slot 13 disposed between the teeth 12 of "9" and "10" and the slot 13 disposed between the teeth 12 of "7" and "8", a winding finishing end 61b is wound around the riser 23 of the segment 22 of "4" that is a start point.

Thus, in such a brake winding 61, by adjusting winding positions of two small coils 61A and 61B in the circumferential direction with the position of the small coil 60A of the main winding 60 among the teeth 12 over the entire circumference of the armature 43 taken into account, the rotation balance of the entire armature 43 can be taken.

In addition, here, at least two sets of small coils (for example, the small coil 61A and the small coil 61B) wound such that two teeth adjacent to each other are positioned on the inner circumferential side in the armature core are disposed in the brake winding 61, and thus the rotation balance of the entire armature can be taken using the small coils of these brake windings.

On the other hand, an H bridge circuit 100 as illustrated in FIG. 4 is disposed between the commutator 20 described above and a DC power supply Ea.

In addition, a motor M illustrated in FIG. 4 corresponds to the electric motor 40 (the armature 43 and the magnet 42 that are rotation elements) illustrated in FIGS. 1 and 2.

This H bridge circuit 100 has four switching elements SW1 to SW4, and the rotation of the motor M is controlled by selective opening/closing (on/off) of these switching elements SW1 to SW4.

A first terminal (for example, a + terminal) of the power supply Ea is connected to a first terminal of the switching element SW1 and is connected to a first terminal of the switching element SW3.

A second terminal of the switching element SW1 is connected to a first terminal of the switching element SW2. A second terminal of the switching element SW2 is connected to a second terminal (for example, a − terminal) of the power supply Ea.

A second terminal of the switching element SW3 is connected to a first terminal of the switching element SW4. A second terminal of the switching element SW4 is connected to a second terminal (for example, a − terminal) of the power supply Ea.

A first terminal of the motor is connected to a connection point between the second terminal of the switching element SW1 and the first terminal of the switching element SW2. A second terminal of the motor is connected to a connection point between the second terminal of the switching element SW3 and the first terminal of the switching element SW4.

Figure 4A:
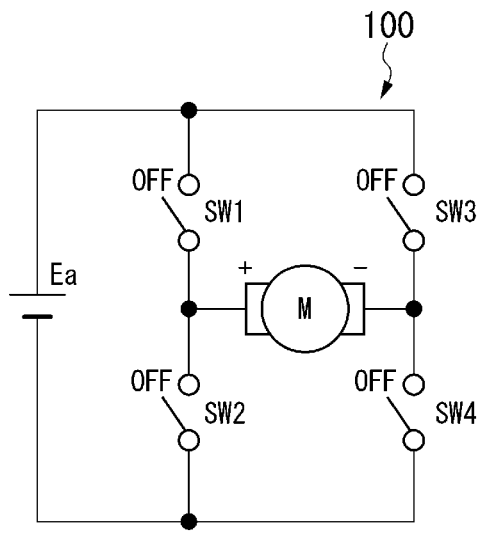
FIG. 4A is a diagram illustrating a first state of an H bridge circuit built into the present disclosure.

More specifically, in the H bridge circuit 100 that is in the first state illustrated in FIG. 4A, all the switching elements SW1 to SW4 become off, the motor M becomes an open circuit, and the armature 43 can be freely rotated.

However, in the brake winding 61, as illustrated in FIG. 3, a closed loop is formed by winding the brake winding around the teeth of the armature core using the segment 22 of "4" of the armature 43 as a winding starting end 61a and a winding finishing end 61b, and thus, even when power supply from the power supply Ea turns off, and all the switching elements SW1 to SW4 become off, a constant braking force can be applied to the armature 43.

As a result, in a case in which the motor device 1 with a deceleration part is mounted in a power window of an automobile, forced rotation of the rotation shaft 44 of the electric motor is regulated, and forced glass lowering according to a glass weight or an external force can be prevented.

Figure 4B:
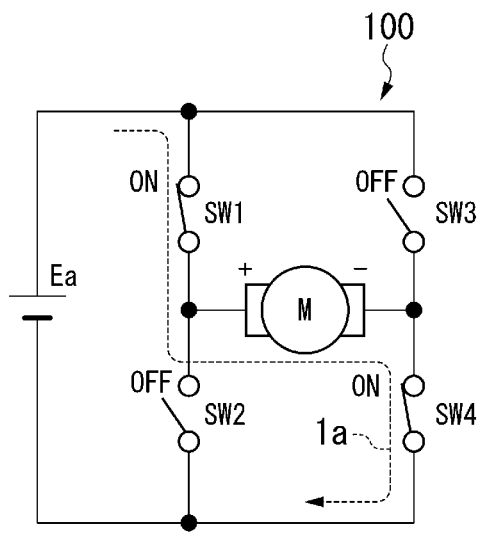
FIG. 4B is a diagram illustrating a second state of the H bridge circuit.

In the H bridge circuit 100 that is in the second state illustrated in FIG. 4B, the switching elements SW1 and SW4 become on, and the switching elements SW2 and SW3 become off, and thus, as denoted by reference sign Ia, a current flows through the motor M, and the motor M rotates forward.

Figure 4C:
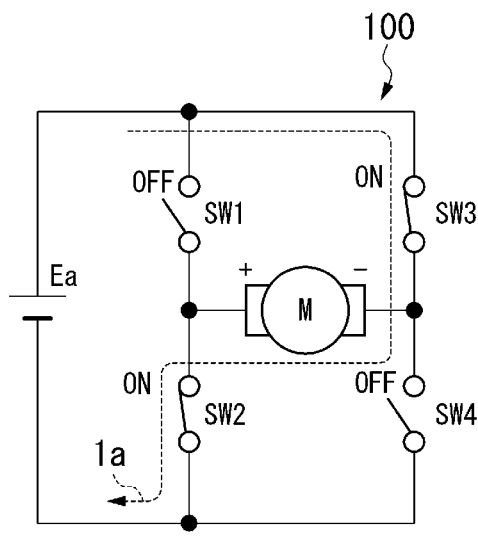
FIG. 4C is a diagram illustrating a third state of the H bridge circuit.

In addition, in the H bridge circuit 100 that is in the third state illustrated in FIG. 4C, the switching elements SW2 and SW3 become on, and the switching elements SW1 and SW4 become off, and thus, as denoted by reference sign Ia, a current flows through the motor M, and the motor M rotates in reverse.

As described above in detail, according to the electric motor 40 of this embodiment, the main winding 60 and the brake winding 61 are provided as windings 14 wound around the teeth 12 of the armature 43. In addition, in the brake winding 61, by adjusting winding positions of two small coils 61A and 61B in the circumferential direction with the position of the small coil 60A of the main winding 60 in the teeth 12 of the armature 43 taken into account, the rotation balance of the entire armature 43 can be taken.

In addition, in the electric motor 40 described above, as illustrated in FIG. 3, the brake winding 61 forms a closed loop using the segment 22 of "4" of the armature 43 as a winding starting end 61a and a winding finishing end 61b, and thus, even when all the switching elements SW1 to SW4 become off, a constant braking force can be applied to the armature 43. As a result, in a case in which the motor device 1 with a deceleration part is mounted in a power window of an automobile, forced rotation of the rotation shaft 44 is regulated, and forced glass lowering according to a glass weight or an external force can be prevented.

Second Embodiment

In the first embodiment, the brake winding 61 is wound around the teeth 12 of the armature core 43a using the same segment 22 (the segment of "4") of the commutator 20 as the winding starting end 61a and the winding finishing end 61b.

Figure 5:
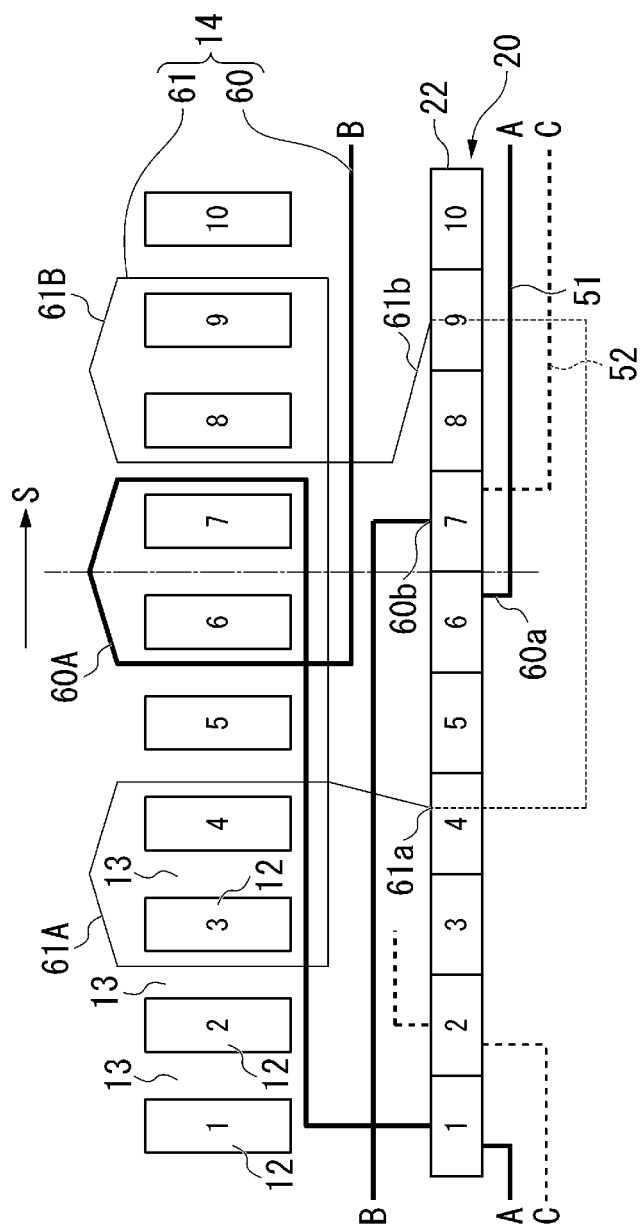
FIG. 5 is a development view of an armature according to a second embodiment of the present disclosure.

However, the disclosure is not limited thereto, and, as illustrated in FIG. 5, the commutator 20 may connect the winding starting end 61a and the winding finishing end 61b of the brake winding 61 to different segments 22 (the segments of "4" and "9").

In other words, in a brake winding 61 according to this embodiment, a commutator 20 is wound around teeth 12 of an armature core 43a using different segments as a winding starting end 61a and a winding finishing end 61b, and, by appropriately changing the circuit of the commutator 20, a closed loop is formed in the brake wining 61, and thus a constant braking force can be applied to an armature 43.

At this time, the winding starting end 61a and the winding finishing end 61b of the brake winding 61 are respectively connected to segments 22 of the commutator 20 having a positional relationship of facing each other with the center of a rotation shaft 44 interposed therebetween. In accordance with this, according to an electric motor 40 of this embodiment, the brake winding 61 can be easily wound.

In addition, in the electric motor 40 according to this embodiment, an H bridge circuit 100 as illustrated in FIG. 4 is disposed between the commutator 20 and a DC power supply Ea.

This H bridge circuit 100, as described above, has switching elements SW1 and SW4 capable of building any one of a first state in which power supply to the commutator 20 is cut off to form an open circuit, a second state in which the rotation shaft 44 is rotated forward, a third state in which the rotation shaft 44 is rotated in reverse, and a fourth state in which a closed circuit is formed within the segment 22 of the commutator 20. In this way, various circuit states of the first state to the fourth state can be built.

Figure 4D:
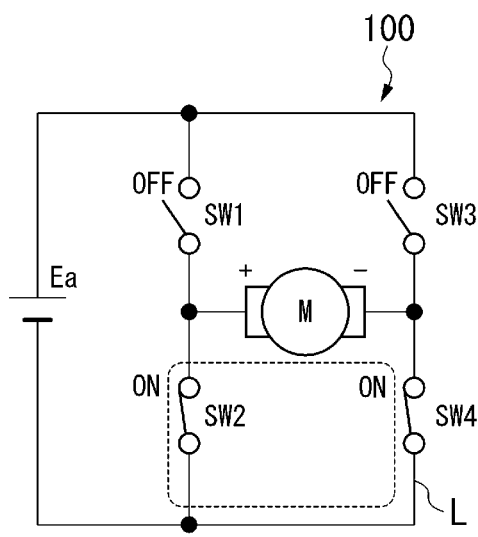
FIG. 4D is a diagram illustrating a fourth state of the H bridge circuit.

In such an electric motor 40, the brake winding 61 may be connected to the H bridge circuit 100 illustrated in FIG. 4, and a part of the loop circuit illustrated in FIG. 4D may be formed through the brake winding 61 in accordance with opening/closing of the switching elements SW1 to SW4 of the H bridge circuit 100.

In accordance with this, the brake winding 61 can apply a constant braking force to the armature 43.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

The present disclosure provides an electric motor mounted in a power window of an automobile or the like and a method for manufacturing the electric motor.

In accordance with this, in the electric motor according to the present disclosure, in the teeth of the armature core, by adjusting the position of the brake winding with respect to a circumferential direction with the coil position of the main winding taken into account, rotation balance of the entire armature can be taken.

In addition, in the electric motor according to the present disclosure, a constant braking force can be applied to the armature using a closed loop formed in the brake winding. As a result, in a case in which the electric motor according to the present disclosure is mounted in a power window of an automobile, forced rotation of the rotation shaft is regulated, and forced glass lowering according to a glass weight or an external force can be prevented.

In addition, in the electric motor according to the present disclosure, the switching elements of the H bridge circuit are selectively open and closed at the time of being built into the H bridge circuit, even when the power of the H bridge circuit becomes off and all the switching elements become off, a closed loop is formed in the brake winding, and therefore, forced rotation of the rotation shaft of the electric motor can be effectively regulated while performing brake control of the armature through the brake winding.

In addition, in the electric motor according to the present disclosure, the H bridge circuit is built in, and when the switching elements of the H bridge circuit are selectively open and closed, the power of the H bridge circuit turns off, and even when all the switching elements turn off, a closed loop is formed in the brake winding. Thus, forced rotation of the rotation shaft of the electric motor can be effectively regulated as brake control of the armature is performed through the brake winding.

In the electric motor according to the present disclosure, in the teeth of the armature core, by adjusting the position of the brake winding with respect to a circumferential direction with the coil position of the main winding taken into account, rotation balance of the entire armature can be taken.

In addition, in the electric motor according to the present disclosure, a constant braking force can be applied to the armature using a closed loop formed in the brake winding.

As a result, according to the present disclosure, rotation balance of the armature can be improved with a simple configuration, and even in a case in which the power of the bridge circuit turns off and each switching element turns off, constant braking of a brake can be realized.

What is claimed is:

1. An electric motor comprising:
   a rotation shaft supported by a yoke to be rotatable;
   an armature core mounted on the rotation shaft and comprising a plurality of teeth radially extending in a diameter direction and comprising a plurality of slots formed between the teeth;
   a winding wound between predetermined slots among the plurality of slots; and
   a commutator disposed to be adjacent to the armature core on the rotation shaft and comprising a plurality of segments to which the winding is connected,
   wherein the winding comprises a main winding that applies a rotational force to the armature core and a brake winding that applies a braking force to the armature core, and an H bridge circuit is built between the winding and a power supply, and wherein the main winding and the brake winding of the winding are disposed at positions for adjusting balance when the armature core rotates, wherein the brake winding comprises at least two sets of small coils that are wound such that two teeth adjacent to each other in the armature core are positioned on an inner circumferential side, wherein the small coils of the brake winding are disposed on the teeth over an entire circumference of the armature core.

2. The electric motor according to claim 1, wherein the brake winding is wound around the teeth of the armature core using a same segment of the commutator as a winding starting end and a winding finishing end.

3. The electric motor according to claim 1, wherein the brake winding is wound around the teeth of the armature core using different segments as a winding starting end and a winding finishing end.

4. The electric motor according to claim 3, wherein the winding starting end and the winding finishing end in the brake winding are connected to the segments of the commutator that have a positional relationship of facing each other with a center of the rotation shaft interposed therebetween.

5. The electric motor according to claim 1, wherein the H bridge circuit comprises a switching element capable of building one of a first state in which power supply to the commutator is cut off to form an open circuit, a second state in which the rotation shaft is rotated forward, a third state in which the rotation shaft is rotated in reverse, and a fourth state in which a closed circuit is formed within the segment of the commutator.

6. The electric motor according to claim 2, wherein the H bridge circuit comprises a switching element capable of building one of a first state in which power supply to the commutator is cut off to form an open circuit, a second state in which the rotation shaft is rotated forward, a third state in which the rotation shaft is rotated in reverse, and a fourth state in which a closed circuit is formed within the segment of the commutator.

7. The electric motor according to claim 3, wherein the H bridge circuit comprises a switching element capable of building one of a first state in which power supply to the commutator is cut off to form an open circuit, a second state in which the rotation shaft is rotated forward, a third state in which the rotation shaft is rotated in reverse, and a fourth state in which a closed circuit is formed within the segment of the commutator.

8. The electric motor according to claim 4, wherein the H bridge circuit comprises a switching element capable of building one of a first state in which power supply to the commutator is cut off to form an open circuit, a second state in which the rotation shaft is rotated forward, a third state in which the rotation shaft is rotated in reverse, and a fourth state in which a closed circuit is formed within the segment of the commutator.

9. A method for manufacturing an electric motor comprising:

a rotation shaft supported by a yoke to be rotatable;

an armature core mounted on the rotation shaft and comprising a plurality of teeth radially extending in a diameter direction and comprising a plurality of slots formed between the teeth;

a winding wound between predetermined slots among the plurality of slots; and a commutator disposed to be adjacent to the armature core on the rotation shaft and comprising a plurality of segments to which the winding is connected, the method comprising:

configuring the winding from a main winding applying a rotational force to the armature core and a brake winding applying a braking force to the armature core and building an H bridge circuit between the winding and a power supply;

disposing the main winding and the brake winding of the winding at positions for adjusting balance when the armature core rotates;

configuring the brake winding from at least two sets of small coils that are wound such that two teeth adjacent to each other in the armature core are positioned on an inner circumferential side; and disposing the small coils of the brake winding on the teeth over an entire circumference of the armature core.

* * * * *